(12) United States Patent
Pieger et al.

(10) Patent No.: US 12,235,619 B2
(45) Date of Patent: Feb. 25, 2025

(54) METHODS FOR CALIBRATING A PROCESSING MACHINE, AND PROCESSING MACHINES

(71) Applicant: TRUMPF Laser-und Systemtechnik GmbH, Ditzingen (DE)

(72) Inventors: Markus Pieger, Wendlingen am Neckar (DE); Frederik Schaal, Fellbach (DE); Matthias Allenberg-Rabe, Stuttgart (DE); Valentin Blickle, Stuttgart (DE); Marc Gronle, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 1066 days.

(21) Appl. No.: 17/066,525

(22) Filed: Oct. 9, 2020

(65) Prior Publication Data

US 2021/0023622 A1    Jan. 28, 2021

Related U.S. Application Data (63) Continuation of application No. PCT/EP2019/057242, filed on Mar. 22, 2019.

(30) Foreign Application Priority Data

Apr. 11, 2018   (DE) .......................... 102018205403.7

(51) Int. Cl.
*G05B 19/401*  (2006.01)
*B22F 10/00*   (2021.01)
(Continued)

(52) U.S. Cl.
CPC .......... *G05B 19/4015* (2013.01); *B22F 10/00* (2021.01); *B22F 10/28* (2021.01);
(Continued)

(58) Field of Classification Search
CPC ............ G05B 19/4015; G05B 19/4099; G05B 2219/49023; G05B 2219/50026;
(Continued)

(56) References Cited

U.S. PATENT DOCUMENTS

| 4,621,926 A | 11/1986 | Merry et al. |
| 5,085,509 A | 2/1992 | Gaffard et al. |

(Continued)

FOREIGN PATENT DOCUMENTS

| CN | 105793666 A | 7/2016 |
| DE | 102015223474 | 6/2017 |

(Continued)

OTHER PUBLICATIONS

CN Office Action in Chinese Appln. No. 201980034490.8, dated Apr. 1, 2022, 20 pages (with English translation).

(Continued)

*Primary Examiner* — Ricardo D Morales
(74) *Attorney, Agent, or Firm* — Fish & Richardson P.C.

(57) ABSTRACT

The disclosure provides methods for calibrating processing machines for the production of 3D components by irradiation of powder layers, wherein the processing machine includes a scanner device for positioning a laser beam in a processing field in which a height-adjustable construction platform for the application of the powder layers by sweeping at least two, e.g., three markings, e.g., in the form of spherical retroreflectors, which are applied on the construction platform and/or on a preform, by the laser beam, detecting laser radiation reflected back from the markings into the scanner device, determining actual positions of the markings, determining deviations of the actual positions of the markings from setpoint positions of the markings, and calibrating the processing machine by correcting the positioning of the laser beam and/or the position of the con- (Continued)

struction platform using the determined deviations. The disclosure also relates to associated processing machines.

17 Claims, 4 Drawing Sheets

(51) Int. Cl.
| | |
|---|---|
| *B22F 10/28* | (2021.01) |
| *B22F 10/31* | (2021.01) |
| *B22F 12/44* | (2021.01) |
| *B22F 12/45* | (2021.01) |
| *B22F 12/49* | (2021.01) |
| *B22F 12/90* | (2021.01) |
| *B33Y 30/00* | (2015.01) |
| *B33Y 50/02* | (2015.01) |
| *G05B 19/4099* | (2006.01) |

(52) U.S. Cl.
CPC ............. *B22F 10/31* (2021.01); *B22F 12/49* (2021.01); *B22F 12/90* (2021.01); *B33Y 30/00* (2014.12); *B33Y 50/02* (2014.12); *G05B 19/4099* (2013.01); *B22F 12/44* (2021.01); *B22F 12/45* (2021.01); *G05B 2219/49023* (2013.01)

(58) Field of Classification Search
CPC .......... G05B 2219/50031; G05B 2219/50042; B22F 10/00; B22F 10/28; B22F 10/31; B22F 12/49; B22F 12/90; B22F 12/44; B22F 12/45; B33Y 30/00; B33Y 50/02; Y02P 10/25; B29C 64/153; B29C 64/268; B29C 64/393
See application file for complete search history.

(56) References Cited

U.S. PATENT DOCUMENTS

| | | |
|---|---|---|
| 5,753,274 A | 5/1998 | Wilkening et al. |
| 6,483,596 B1 | 11/2002 | Philippi et al. |
| 6,594,006 B1 | 7/2003 | Muehlhoff et al. |
| 7,261,550 B2 | 8/2007 | Herzog |
| 8,237,788 B2 | 8/2012 | Cooper et al. |
| 9,993,976 B2 | 6/2018 | Coeck et al. |
| 10,030,972 B2 | 7/2018 | Iseli et al. |
| 10,308,006 B2 | 6/2019 | Chou et al. |
| 10,739,191 B2 | 8/2020 | Wagenblast et al. |
| 2008/0309949 A1* | 12/2008 | Rueb ..................... G01S 7/4812 356/614 |
| 2015/0241201 A1 | 8/2015 | Suzuki et al. |
| 2015/0346330 A1 | 12/2015 | Markendorf |
| 2018/0345582 A1 | 12/2018 | Schade |
| 2018/0354034 A1* | 12/2018 | Vaes ..................... B29C 64/277 |
| 2019/0270161 A1 | 9/2019 | Allenberg-Rabe et al. |

FOREIGN PATENT DOCUMENTS

| | | |
|---|---|---|
| DE | 102016222186 | 4/2018 |
| DE | 102016222187 | 5/2018 |
| EP | 0734842 | 10/1996 |
| EP | 1048441 | 11/2000 |
| EP | 1521657 | 4/2005 |
| EP | 1914564 A1 | 4/2008 |
| EP | 2878920 A1 | 6/2015 |
| EP | 3162542 | 5/2017 |
| WO | WO 2009/026520 | 2/2009 |
| WO | WO 2015/040185 | 3/2015 |
| WO | WO 2016/085334 | 6/2016 |

OTHER PUBLICATIONS

CN Office Action in Chinese Appln. No. 201980034490.8, dated Oct. 18, 2022, 21 pages (with English translation).
DE Office Action in German Appln. No. 19713750.8, dated Apr. 13, 2023, 15 pages (with English translation).

* cited by examiner

METHODS FOR CALIBRATING A PROCESSING MACHINE, AND PROCESSING MACHINES

CROSS REFERENCE TO RELATED APPLICATIONS

This application is a continuation of and claims priority under 35 U.S.C. § 120 from PCT Application No. PCT/EP2019/057242, filed on Mar. 22, 2019, which claims priority from German Application No. 10 2018 205 403.7, filed on Apr. 11, 2018. The entire contents of each of these priority applications are incorporated herein by reference.

TECHNICAL FIELD

The present disclosure relates to methods for calibrating a processing machine for the production of three-dimensional components by irradiation of powder layers, wherein the processing machine includes a scanner device for positioning a laser beam in a processing field in which a height-adjustable construction platform for the application of the powder layers is positioned. The disclosure also relates to associated processing machines for the production of three-dimensional components.

BACKGROUND

In the above-described processing machines for the production of three-dimensional components, a laser beam is focused onto a layer of a powder material, for example in the form of a metal powder, which is typically arranged in a processing plane of the processing machine. The powder material is locally fused, or sintered, by the laser beam to produce a layer of the three-dimensional component (laser metal fusion, LMF or selective laser sintering, SLS). A scanner device for aligning or positioning the laser beam typically includes at least one, generally two, deflectable rotatable scanner mirrors, the maximum deflections or angle settings of which delimit a processing field of the scanner device.

During the alignment of the processing beam with different positions in the processing field, the scanner mirror or mirrors are tilted to modify the X position and/or the Y position of the laser beam in the processing field. Particularly in the generative manufacture of three-dimensional components that do not consist exclusively of the powder material, but in which merely an upper part of the component, which is constructed on a prefabricated lower part (preform), is manufactured by the irradiation of powder layers, the problem arises that the laser beam must strike the bonding region of the preform, in particular the contour of the preform, precisely in all spatial directions. If this is not the case, the manufactured component has offset locations and/or insufficient bonding at the bonding region.

When constructing on a preform, it is therefore necessary to ensure that the contour exposure by means of an exposure laser used for this purpose exactly follows the contour of the preform. Conventional requirements for the accuracy are in this case about +/−50 μm. For maximally precise bonding, it is typically furthermore necessary for the bonding zone of the preform to be tilted less than about +/−20 μm with respect to the processing plane.

EP 0 734 842 A1 describes an apparatus and a method for the production of a three-dimensional object by successive solidification of layers of a construction material in powder form, which can be solidified by means of electromagnetic radiation (energy beam) or particle radiation. A base (preform), which is formed from a material to which the construction material adheres during the solidification, is removably fastened on the upper side of a height-adjustable carrier for the application of the material.

EP 1 048 441 A1 describes a method for calibrating such an apparatus, in which a calibration plate having reference markings, which is arranged at a known position in a machine-referenced coordinate system of the apparatus, is used. The energy beam is deflected onto predetermined setpoint positions in the machine-referenced coordinate system. Recording of the deviation of the actual positions of the points of impact of the energy beam from the setpoint positions is carried out by using the reference markings. The adjustment of a controller for deflecting the directional energy beam, and therefore calibration of the apparatus, are carried out as a function of the deviations.

SUMMARY

The present disclosure provides methods for calibrating a processing machine, and processing machines that allow precise bonding of a layerwise constructed three-dimensional component to a preform. These methods include sweeping at least two markings, preferably at least three markings, for example, in the form of retroreflectors, which are applied on a construction platform and/or on a preform fixed to the construction platform, by a laser beam, detecting laser radiation reflected back into a scanner device during the sweeping of the at least two markings, determining actual positions of the markings with the aid of the detected laser radiation, determining deviations of the actual positions of the markings from (predetermined) setpoint positions of the markings, and calibrating the processing machine by correcting the positioning of the laser beam in the processing field and/or the position of the construction platform in the processing machine with the aid of the determined deviations.

For the correction of the positioning of the laser beam, correction data, for example, can be calculated to correct the path data, or setpoint positions, specified to the scanner device for the production of the three-dimensional component. For the correction of the position of the construction platform in the processing machine, adjustment screws, which can be adjusted manually or in an automated fashion, for example, by an actuator, to correct the position of the construction platform (optionally with the preform applied thereon) can, for example, be provided in the processing machine.

According to the disclosure, it is proposed to determine the actual location or the actual alignment of the construction platform, or of the preform fixed to the construction platform, relative to a coordinate system of the scanner device, or of the processing machine, and if required to correct the positioning of the laser beam in the processing field, i.e., to adapt the actual location/alignment of the construction platform, or of the preform. As an alternative or in addition, the position of the construction platform in the processing machine, in particular its alignment relative to the (horizontal) processing plane, can also be corrected. This ensures that the bonding of the component to be constructed on the preform exactly follows the predetermined contour of the preform. It is to be understood that such a correction may also be advantageous if there is no preform in the processing machine, i.e., when the three-dimensional component is produced entirely by layerwise construction from the powder layers.

In one embodiment, a lateral offset and/or a rotation of the construction platform and/or of the preform in the processing plane is/are corrected with the aid of the determined deviations. To this end, the actual positions, or more precisely the (two-dimensional) position coordinates, or corresponding thereto the angle settings of the scanner mirror or mirrors of the scanner device, of (at least two) markings that are applied (in a fixed position) on the construction platform or on the preform are determined. During the laser sweeping of the at least two markings, the actual position of the markings (X coordinate and Y coordinate, or corresponding angle settings of the scanner mirror or mirrors) may be determined by calculating back the lateral path of the laser beam in the coordinate system of the scanner device.

With the aid of a comparison of the actual positions with the setpoint positions of the two markings, it is possible to determine both a lateral offset of the construction platform/preform relative to a setpoint position and a rotation of the construction platform/preform relative to a setpoint alignment in the processing plane of the processing machine. The rotation may be determined, for example, with the aid of a deviation of a setpoint alignment of a distance vector between the setpoint positions of the two markings and an actual alignment of a distance vector between the actual positions of the two markings. In addition to the rotation of the construction platform/preform, the lateral offset of the construction platform may also be determined with the aid of a difference between a respective actual position and a respective setpoint position of a respective marking, and optionally may be corrected during the positioning of the laser beam in the processing field. If suitable adjustment devices are provided in the processing machine, the lateral position of the construction platform or its rotation in the processing plane, optionally, can be corrected. In the ideal case, the construction platform can then be moved to its setpoint position in the processing machine, so that correction during the positioning of the laser beam in the processing field may possibly be dispensed with.

To avoid false results occurring during the determination of the deviation because of a tilt of the construction platform/preform relative to the processing plane (or a plane parallel thereto), which leads to a length change between the detected actual positions of the markings, it is necessary for the construction platform/preform to be leveled before the calibration, i.e., brought into a location aligned parallel with the processing plane, or for the tilt to be taken into account during the calibration.

In one embodiment, a tilt of the construction platform and/or of the preform relative to the processing plane of the processing machine is determined by a distance measurement, and the determined tilt of the construction platform and/or of the preform relative to the processing plane is corrected. For the triangulation, it is, for example, possible to use a triangulation laser that is optionally arranged in an irradiation device in addition to a working laser, which is used for the irradiation of the powder layers. The triangulation laser beam of the triangulation laser, for example, can be coupled coaxially with the processing laser beam into the beam path of the scanner device.

As an alternative, a further scanner device can be provided in the processing machine for the triangulation, or for the triangulation laser. The use of an additional triangulation laser is not absolutely necessary, however, and a pilot laser already provided in the processing machine, or the working laser that is used for the irradiation of the powder layers, can be used instead for the triangulation. A camera-based structural evaluation can be used for the triangulation or the distance measurement. In general, however, the triangulation works only when the preform fixed to the construction platform does not have a very large extent in the vertical direction (Z direction), since in this case the triangulation laser beam used for the triangulation can possibly be shadowed.

In one alternative embodiment, a deviation between a respective setpoint distance and a respective actual distance, respectively between two of at least three markings, e.g., arranged in a triangle, is determined, and a tilt of the construction platform and/or of the preform relative to the processing plane is corrected with the aid of the determined deviation. In this embodiment, information about the tilt or about the Z location of the construction platform/preform is determined with the aid of the actual positions or the actual distances of the (at least) three markings. The setpoint distance in this case represents the difference vector between the (two-dimensional) setpoint positions respectively of two markings. Correspondingly, the actual distance represents the difference vector between the (two-dimensional) actual positions, respectively, of two of the markings.

By the use of the at least three markings, leveling, i.e., manual or automated correction of the tilt of the construction platform in the processing machine, or taking the tilt of the construction platform/preform into account during the positioning of the laser beam in the processing field, is also possible for the case in which the preform has a significant extent in the vertical direction, which leads to the above-described shadowing of the triangulation laser beam so that leveling cannot be carried out by triangulation.

During the laser sweeping of three markings, for example, a virtual triangle is formed, the three vertices of which are formed by the markings. Both the setpoint positions of the three markings and the setpoint distances respectively between two of the markings, i.e., the setpoint lengths of the three sides of the triangle, are known from the path data for the production of the three-dimensional component. If slanting of the construction platform/preform takes place as a result of operation, this is detected during the laser sweeping of the markings by the laser beam, because the length of the sides of the triangle from the viewing angle of the scanner device changes.

If one of the vertices of the triangle is tilted upward out of a horizontal plane (processing plane), the scan angle at which the laser beam must be aligned to detect the vertex with the marking increases. Correspondingly, in the event of slanting in which a marking forming the vertex is tilted downward out of a horizontal plane, the scan angle for detecting this angle decreases. With the aid of the variation of the scan angle and therefore of the actual position of the respective marking, or the increase or decrease of the actual distance, and knowledge of the setpoint distance respectively between two markings, it is therefore possible to identify unequivocally whether the respective marking lies above (increase of the actual distance with respect to the setpoint distance) or below (decrease of the actual distance with respect to the setpoint distance) a horizontal plane in the Z direction, or a nominal location in the Z direction. The positioning of the laser beam in the processing field can be correspondingly corrected with the aid of the determined deviation.

The setpoint positions of the markings are transferred to the scanner device or to a control device, and used for the production of the three-dimensional component, of the processing machine, together with the path data for the production of the three-dimensional component. The setpoint positions of the markings are positions that are occupied by the markings when there is a desired setpoint location/alignment of the construction platform/preform. For the specification of the setpoint positions, it is therefore necessary to know the positions of the markings relative to the construction platform/preform. The setpoint positions can be, in principle, assumed to be known when the markings are applied with high precision on the upper side of the construction platform, or the upper side of the preform.

In some embodiments, the construction platform and/or the preform is/are measured in a preceding step to determine the setpoint positions of the markings relative to the construction platform and/or the preform. The measurement can be carried out, for example, with the aid of a coordinate measuring machine, such as a probe that is used to sense the setpoint positions on the surface of the construction platform and/or of the preform. With the aid of the positions of the markings relative to the construction platform/preform, it is possible to define the setpoint positions of the markings, which are used for the determination of the deviations as described herein, by using the known setpoint position or the setpoint location of the construction platform/preform relative to the coordinate system of the processing machine.

Typically, the two or more markings are applied at a distance from one another on the upper side of the construction platform or of the preform. The markings are generally applied next to the side edge, or the outer diameter, of the construction platform, or of the preform, in order not to hinder the production of the three-dimensional component. For the accuracy of the calibration, it is furthermore generally favorable for the markings to have the greatest possible distances from one another.

The markings can be formed, for example, by reflective, scattering, or absorbent surface regions, which are applied on a substrate having a respectively different property so that the markings can be detected with the aid of laser radiation reflected or scattered back into the scanner device during the laser beam sweep. In the context of this application, the phrase "laser radiation reflected back into the scanner device" is also intended to include laser radiation that is scattered back into the scanner device from such a scattering marking.

The markings, for example, may have a geometry in the manner of circles, points, or crosses. For example, the markings can be configured in the form of ring structures made of a thin gold layer on a ceramic substrate, which are applied on the construction platform or the preform. The markings can also be reflective surface regions adjoined by a non-retroreflective, e.g., absorbent and/or scattering surface region, which is formed from the material of the substrate.

In a further embodiment, the laser beam is reflected at a retroreflector in the form of a three-dimensional object, e.g., a sphere, back into the scanner device, the actual position of the retroreflector being determined, for example, with the aid of an intensity distribution of the detected back-reflected laser radiation.

In this embodiment, a retroreflector in the form of a reflective three-dimensional object, which reflects a significant proportion of a laser beam striking the retroreflector, substantially independently of the angle of incidence, back to the beam source—in the present case to the scanner device—is used for the calibration or registration of the processing machine. A "three-dimensional object" is intended to mean an object that has an extent of at least 20 µm in all three spatial directions. For example, a three-dimensional object may have an extent of at least 50 µm, at least 100 µm, or at least 1 mm, in all three spatial directions.

The retroreflector has a reflectivity of, for example, more than 5% in the incidence direction of the laser beam over a large angle of incidence range. The reflectivity of the retroreflector in the incidence direction is therefore significantly greater than in the case of conventional reflective objects or materials, with which the incident radiation is reflected (only) specularly so that only a very small proportion of scattered laser radiation is reflected back in the incidence direction of the laser beam. The increased intensity of the laser radiation reflected back to the scanner device by the retroreflector increases its detectability and therefore the precision during the determination of the actual position of the retroreflector in the processing field.

In this embodiment, the retroreflector may be, for example, a (small) sphere, which can be formed from a material that transmits the laser beam, for example glass, e.g., quartz glass, sapphire, diamond, etc., and which generally has a diameter on the order of several micrometers to a few millimeters, and is generally less than 10 mm in diameter. Such a three-dimensional retroreflector allows a very precise determination of the actual position of the retroreflector in the processing field, which is specified by the position, or more precisely by the XY coordinates, of the center of the transparent sphere.

The transparent sphere acts as a retroreflector, because it focuses a large part of the light incident from a light source far away onto a spot in the region of the rear surface of the sphere, or optionally on the front surface of sphere, the rear surface or optionally the front surface of the sphere acting as a retroreflector because of the difference in refractive index between the sphere and the environment, typically air. It is to be understood that three-dimensional objects configured in a different way, for example, as prisms or the like, can optionally also be used as retroreflectors. It is to be understood that the sphere in the preceding and subsequent embodiments need not necessarily be configured to be transparent for the laser beam, if the front surface of the sphere acts as a (retro)reflector.

To determine the actual position of the retroreflector, the procedure described below may for example be adopted: the retroreflector in the form of the three-dimensional object is swept (e.g., several times) by the laser beam, the scanner device scanning a region with a predetermined spatial extent and the laser radiation reflected back respectively being detected. If the position of the laser beam in the processing field corresponds exactly to the actual position of the retroreflector, maximum reflection of the laser beam takes place at the retroreflector, i.e., a maximum intensity of the reflected laser radiation is detected. In the event of deviations between the actual position of the laser beam and the actual position of the retroreflector, a lower intensity of the reflected laser radiation is detected. An intensity centroid is determined as the actual position of the retroreflector from the two-dimensional intensity distribution (e.g., bitmap) of the detected laser radiation with the aid of an image evaluation algorithm.

In one implementation, the sphere is held in a frame which is fixed, e.g., screwed, to the construction platform or to the preform before the calibration. For maximally precise calibration of the processing machine, it is necessary for the lateral position of the sphere on the construction platform/preform to be defined as precisely as possible, and, for example, for the play between the sphere, or the frame, and the construction platform/preform to be minimized. To this end, the frame can include a screw thread and a precision fitting collar, which allows lateral positioning of the sphere with the accuracy of a milling machine that is used for milling a bore with a mating thread (fitting screw, or fitting) into the construction platform/preform.

The frame can also have an exactly defined height from an axial stop of the precision fitting collar to the center of the sphere. The sphere can then be gripped in the frame in the form of a (reference) screw by a thermally induced tension, for example, by the frame being heated to about 80° C. during the mounting of the sphere. In order not to lose the tension of the frame during operation of the processing machine, a material that has a linear thermal expansion coefficient as close as possible to that of the material of the sphere can be selected for the frame. If the material of the sphere is sapphire ($Al_2O_3$), then, for example, KOVAR® (a nickel-cobalt ferrous alloy) can be selected as the material for the frame, because the two materials have an approximately equal linear thermal expansion coefficient.

In a further embodiment, the markings are arranged in or in the vicinity of a processing plane of the processing machine by moving the height-adjustable construction platform to carry out the calibration. A working surface is typically formed at the height of the processing plane in the processing chamber. The arrangement of the markings "in the vicinity of" the processing plane is intended to mean a deviation of about one millimeter in the vertical direction from the processing plane (downward). The markings should not protrude upward beyond the processing plane to prevent collision with a slide arm or the like, which is used to transport powder onto the construction platform. In the above-described retroreflector in the form of a sphere, the lateral surface of the sphere may, for example, protrude freely beyond the frame and be installed in a recess, typically of a fitting screw, in the construction platform/preform in such a way that the lateral surface lies a few tenths of a millimeter below the processing plane when the construction platform/preform lies with its upper side at the height of the construction platform.

Besides precise measurement of the actual positions of the markings in the processing field, it is generally also necessary or favorable that the absolute position of the markings in the height direction, i.e., perpendicular to the processing plane, can be determined as precisely as possible. Because of the fixing of the markings to the construction platform, or to the preform, the height position of the markings relative to the construction platform—a planar alignment of the construction platform is assumed—is in principle known. By the determination of a distance in the height direction between the markings and a reference height, the absolute height position of the construction platform can therefore be determined. The absolute height position may be related to the reference height in the processing machine, which can for example be the height position of the processing plane, a different reference height of the height-adjustable construction platform, a height position of the irradiation device or of the scanner device, for example, the height position of a point of rotation of the scanner device (see below). If the absolute height position of the construction platform is known, it is possible in particular for a zero point of the construction platform relative to the height position of the processing plane, which is otherwise generally affected by a large inaccuracy, to be defined precisely.

In one embodiment of the methods, a distance in the height direction between at least one of the markings and the scanner device, e.g., a point of rotation of the scanner device is determined by triangulation to align the laser beam with the at least one marking. For the determination of the distance in the height direction, it is typically assumed that the construction platform is leveled, i.e., that it is aligned parallel with the processing plane. As is conventional in triangulation, the distance in the height direction between the point of rotation and two of the markings can be determined by aligning the laser beam, starting from the point of rotation, at a respective (observation) angle in relation to the height direction (Z axis) with the first and the second marking, respectively, and determining the distance in the height direction with the aid of the two (observation) angles and with the aid of the (known) distance between the two markings. The alignment or rotation of the laser beam is made possible by the scanner device of the processing machine. When two scanner mirrors are used, the point of rotation of the laser beam, or of the scanner device, lies between the two axes of rotation of the scanner mirrors.

For the case in which, as described above, the markings are spheres held in a frame, which are mounted or fixed on the construction platform or on the preform before the calibration, the distance between the markings has a relatively high tolerance, i.e., it is affected by a large measurement uncertainty. In general, however, the processing machine in which the calibration method is carried out includes one or more positioning systems, or actuators, which allow movement with high precision. For example, this may involve an actuator or a drive for precise displacement of the height-adjustable construction platform in the height direction or an actuator in the form of a further scanner device for high-precision positioning of a further laser beam.

In order not to use the distance, affected by measurement uncertainty, between the two markings for the determination of the distance in the height direction in relation to the scanner device, it is preferably not taken into account during the triangulation, i.e., it is eliminated from the respective equations. The distance between the markings is replaced with a different measurement quantity of the actuator system(s), which is used for the triangulation and which is known more precisely, or can be measured more precisely. In this way, the measurement uncertainty is shifted to the actuator system or systems, which, because of their high accuracy, contribute to a lower measurement uncertainty during the determination of the distance in the height direction. Ideally, in this case the same marking is measured at least two times for the triangulation, i.e., it is observed or swept with the laser beam at two or more different (viewing) angles in relation to the height direction (Z axis).

In one implementation, to determine the distance, the height-adjustable construction platform is displaced in the height direction and the distance is determined by triangulation with the aid of a travel distance of the construction platform in the height direction between a first height position and a second height position, for example, with the aid of an angle at which the laser beam is aligned with the at least one marking at a respective height position. In this case, the (observation) angle during the observation of the same marking at two different height positions of the construction platform is determined starting from the same observation point, for example the same point of rotation, and the travel distance of the construction platform in the height direction is used as a third measurement quantity for the triangulation. It is to be understood that the distance in the height direction from the scanner device can be determined in this way not only for one, but also for two or more of the markings. If the construction platform or the preform is leveled correctly, the same distance in the height direction should respectively be obtained in this case so long as the height position of the markings relative to the construction platform or the preform does not differ. To determine the distance of all the markings, or the plane with the markings (or the construction platform and/or the preform), from the scanner device, (optionally weighted) averaging of the distances that have been determined for the individual markings can be carried out.

In a further implementation, to determine the distance, a further laser beam of a further scanner device is aligned with the at least one marking and the distance is determined by triangulation with the aid of a separation of the scanner device from the further scanner device, e.g., with the aid of a separation of a point of rotation of the scanner device from a point of rotation of the further scanner device, and with the aid of a respective angle at which the laser beam and the further laser beam are aligned with the at least one marking. The processing machine on which the calibration is carried out in this case includes two or more scanner devices and can be, for example, configured as described in DE 10 2016 222 186 A1, which in respect of this aspect is incorporated by reference into the content of the present application. The further scanner device can be, for example, part of a further irradiation device, which is similar to or has the same design as the irradiation device in which the scanner device is provided.

In this implementation as well, the same marking is observed two times from different (viewing) angles, but from different observation points, which can, for example, correspond to the points of rotation described above. In this case, the known separation, which can be determined well during the calibration of the scanner device and of the further scanner device relative to one another, between the two points of rotation, or between the two scanner devices, is used in addition to the respective angles for the triangulation. In this way as well, the measurement uncertainty during the determination of the distance in the height direction can be reduced.

The measurement uncertainty can be additionally reduced by repeated movement of the height-adjustable construction platform in the height direction to three or more different height positions, a respective distance in the height direction being determined with the aid of a travel distance respectively between two of the height positions. The same applies for determination of the distance from the scanner device or devices with the aid of further (third, fourth, . . . ) scanner devices. In this case, the same marking can be observed from three or optionally more (viewing) angles to further increase the measurement or detection accuracy. The above-described approaches can be, for example, combined or carried out in parallel (simultaneously), by (optionally weighted) averaging of the values determined in the different measurement strategies, to increase the measurement accuracy during the determination of the distance in the height direction of the markings from the scanner device and therefore during the determination of the height position of the construction platform or the preform as a whole.

In a further embodiment, a pilot laser beam is used for the calibration of the processing machine. The pilot laser beam used for the calibration typically has a lower power than the processing laser beam used for the irradiation of the powder layers. This is favorable to avoid damage to the retroreflector by the laser beam. A fiber laser, through the fiber of which the pilot laser beam of the fiber laser, which has a lower power than the processing laser beam and which is positioned in the processing field with the aid of the scanner device, is also transmitted, may for example be used as the laser source. The wavelength of the pilot laser beam can also differ from the wavelength of the processing laser beam. As an alternative, the calibration may optionally also be carried out with the processing laser beam used for the irradiation, or for the fusion of the powder layers.

In a further embodiment, the methods additionally include detecting at least one retroreflector in the processing field by scanning at least one search region, predetermined with the aid of the setpoint position of the retroreflector, in the processing field by the laser beam. The (two-dimensional, e.g., X/Y) setpoint position of the retroreflectors, e.g., in the form of spheres, can be specified in the processing machine, typically in a control device, for example, in the form of a table or the like. To find the retroreflectors at their respective actual position, in this example a search window in the form of a subregion of the processing field is defined around the predetermined setpoint position. This search region is initially scanned coarsely, i.e., with a low resolution, by means of the laser beam until the respective retroreflector is found. Subsequently, as described above, the retroreflector, e.g., in the form of the sphere, is swept finely, i.e., with a higher resolution, to determine the exact actual position of the retroreflector.

A further aspect of the disclosure relates to processing machines for the production of three-dimensional components by irradiation of powder layers, which include:

an irradiation device having a scanner device for positioning a laser beam in a processing field, a processing chamber, in which a processing field is formed and which includes a construction platform for the application of the powder layers, at least two markings, e.g., in the form of retroreflectors, which are applied on the construction platform and/or on a preform fixed to the construction platform, a detector for detecting laser radiation which is reflected by the markings back into the scanner device during the sweeping of the markings with the laser beam, an evaluation device for determining actual positions of the markings with the aid of the detected laser radiation, and a control device for determining deviations of the actual positions of the markings from setpoint positions of the markings and for correcting the positioning of the laser beam in the processing field and/or the position of the construction platform in the processing machine with the aid of the determined deviations.

It is to be understood that, also for the case in which a preform is fixed (in a fixed position) to the construction platform, the markings can be applied on the construction platform and not on the preform. This may be favorable since the preform may possibly need to be processed mechanically, for example by introducing threaded bores or the like for holding the markings into the preform, in order to apply it in a fixed position. Since the material of the preform bonds to the powder material and forms a lower part of the component produced in the processing machine, such mechanical processing may be undesired. In the case of particular preforms, for example dental implants, there may also be no space available for applying the markings. However, application of the markings on the preform makes it possible to identify and correct defective fixing, for example defective alignment, of the preform relative to the construction platform, which is typically not possible when applying the markings on the construction platform. The preform can be fixed (releasably) to the construction platform in various ways, for example by clamping, by a latching connection, by fixing pins that are fitted into bores of the construction platform, etc.

In one embodiment, the control device is configured to correct a lateral offset and/or a rotation of the construction platform and/or of the preform in the processing plane with the aid of the determined deviations. For the correction of a lateral offset and/or a rotation, it is sufficient to apply two markings, separated from one another, on the construction platform or on the preform. As described herein, the markings are typically applied on the upper side of the construction platform or of the preform. In principle, the markings may be applied at any place on the construction platform/preform that can be reached by the laser beam in the processing field. It is to be understood that two or more preforms, which are optionally provided with their own markings, can also be fixed to the construction platform. The correction of the positioning of the laser beam in the processing field can be carried out in the manner described herein. For automated correction of the position of the construction platform, e.g., of its tilt in relation to the processing plane, the control device can act on suitable adjustment devices, for example in the form of adjustment screws, with the aid of actuators.

In one embodiment, the processing machine includes a distance measuring device, in particular a triangulation laser, which is configured to determine a tilt of the construction platform and/or of the preform relative to the processing plane of the processing machine, the control device being configured to correct the tilt, determined by the distance measuring device, of the construction platform and/or of the preform relative to the processing plane. The distance measuring device can include a triangulation laser as an emitter, as well as a receiver that determines the distance from the construction platform and/or the preform at a plurality of positions, and determines therefrom the tilt of the construction platform and/or of the preform relative to the processing plane, or relative to a typically horizontal plane parallel thereto. The working laser or a pilot laser may optionally be used as the triangulation laser, although it is also possible for the processing machine to include an additional laser that is used as the triangulation laser. The distance measuring device does not necessarily need a laser, and it may instead be sufficient for a static line projection to be carried out onto the construction platform/preform and for this to be evaluated by means of an image acquisition device and image evaluation to determine the tilt of the construction platform and/or of the preform relative to the processing plane.

The use of the distance measuring device may not be readily possible for preforms that have a relatively large height and/or of an unfavorable geometry, since in this case the triangulation laser beam generated by the triangulation laser is shadowed by the preform. The triangulation laser typically forms a part of the irradiation device and is therefore arranged above the processing chamber, or the construction platform/preform. Shadowing of the triangulation laser beam, however, typically occurs only when the markings are applied on the construction platform and not on the preform, since the markings for the calibration are typically positioned in or in the vicinity of the processing plane. For the case in which the markings are applied on the upper side of the preform, with many geometries of the preform this disadvantage can be avoided.

In a further embodiment, the control device is configured to determine deviations between a respective setpoint distance and a respective actual distance, respectively of two of at least three markings, e.g., arranged in a triangle, and the control device is configured to correct a tilt of the construction platform and/or of the preform relative to the processing plane with the aid of the determined deviations. In this embodiment, the actual distances and the setpoint distances between the markings are obtained to determine, and if necessary correct, the tilt of the construction platform/preform in relation to the processing plane with the aid of the deviations. In contrast to the above-described determination of the tilt by triangulation, the present embodiment dispenses with the need for an additional distance measuring device.

In a further embodiment, the retroreflector is configured as a three-dimensional object, e.g., as a sphere. As described above, the precision during the determination of the actual position of the retroreflector can be increased significantly by a marking in the form of such a retroreflector. In one implementation, the (transparent) sphere is formed from quartz glass or from sapphire, and/or it has a diameter of less than 5 mm. The diameter of the sphere may lie, for example, between about 0.5 mm and 5 mm, a higher resolution during the determination of the actual position of the retroreflector generally being achievable with a smaller diameter of the sphere than with a larger diameter of the sphere.

When using a detector that does not resolve position for the detection of the laser radiation reflected back into the scanner device, inevitably only laser radiation reflected back in a particular angle range is detected by it, the incidence and emergence direction of the laser beam at the retroreflector being superimposed on the angle range because of the arrangement of the detector (in general coaxially with the beam path of the laser beam). When using a sphere as the retroreflector, the resolution during the determination of the beam profile also depends, besides the size or the diameter of the sphere (see above), on where the focus of the laser radiation entering the sphere lies. If the focus lies directly on the rear side of the sphere because of the refractive index of the transparent material of the sphere, the laser radiation is for a large part reflected back into a narrow angle range around the incidence direction of the laser beam, so that the resolution of the measurement method is relatively low. If the refractive index of the sphere is greater or less than the value for which the focus lies directly on the rear side of the sphere, so that the laser beam is focused in front of or behind the rear side of the sphere, the laser radiation reflected back broadens slightly so that only a fraction of the laser radiation reflected back, which typically enters the sphere substantially centrally, is respectively detected, so that the actual position of the retroreflector can be determined with a higher resolution during the scanning sweep.

The refractive index for which the focus lies approximately on the rear side of the sphere is approximately $n=2.0$. The sphere is preferably formed from quartz glass ($SiO_2$) or from sapphire ($Al_2O_3$), since both materials have a relatively low refractive index, so that the focus of the laser beam in this case lies behind the rear side of the sphere. Quartz glass in particular, which has a relatively low refractive index of approximately $n=1.54$ over a relatively large wavelength range, has been found to be advantageous for carrying out the method. It is, however, to be understood that other materials, for example other glasses, can also be used as sphere materials. Materials that have a relatively high refractive index, for example diamond with $n=2.42$, may optionally also be used as materials for the sphere, since in this case the focus lies in front of the rear side of the sphere and the laser radiation reflected back is likewise broadened.

In a further embodiment, the sphere is held in a frame, which can include a screw thread for fixing in a fitting screw of a bore of the construction platform and/or of the preform. As described herein, the frame can include a precision fitting collar for increasing the accuracy of the lateral positioning of the sphere on the construction platform/preform. The frame, in particular the precision fitting collar, typically includes an axial stop arranged at an exactly predetermined distance from the center of the sphere. The fitting screw typically likewise includes an axial stop, in the form of a shoulder or the like, applied at a precisely predetermined distance from the upper side of the construction platform/ preform.

In a further embodiment, the frame includes at least one opening for a radiation component of the laser beam to emerge. Radiation components of the laser beam, which otherwise would be absorbed by the frame and would lead to undesired heating of the frame, can emerge from the frame through the at least one opening.

In a further embodiment, the control device is configured to determine by triangulation a distance in the height direction between at least one of the markings and the scanner device, preferably a point of rotation of the scanner device, to align the laser beam at an angle with the at least one marking. In this embodiment, the distance of the marking(s) from the scanner device and therefore from a defined height position in the processing machine is determined. With the aid of this distance, it is of course also possible for a distance of the marking(s) in the height direction from another defined height position in the processing machine to be determined or calculated, for example, the height position of the processing plane. For the determination of the distance in the height direction, it is sufficient for the angle at which the marking is observed to be known, i.e., determination of the coordinates of the actual position of the marking in the processing field is not necessary. The laser beam can be aligned with the respective marking in the manner described above, e.g., by sweeping the markings and detecting the laser radiation thereby reflected back into the scanner device, so that the (rotation) angle of the laser beam during the alignment with the marking can be determined.

In one implementation, the control device is configured to determine the distance, to displace the height-adjustable construction platform in the height direction and determine the distance by triangulation with the aid of a travel distance of the construction platform between a first height position and a second height position, and preferably with the aid of an angle at which the laser beam is aligned with the at least one marking at a respective height position. Besides the travel distance or the height difference, the two angles from a common reference point, for example, the point of rotation, to the same marking are generally also used for the triangulation. In the present case, the distance of the marking in the first height position of the construction platform from the scanner device can be determined by triangulation. It is, however, likewise possible to determine the distance between the marking in the second height position of the construction platform and the scanner device.

In a further implementation, the processing machine includes a further scanner device for aligning a further laser beam with a further processing field, which is formed in the processing chamber, and the and/or a further control device (of the further scanner device or of a further irradiation device) is configured, to determine the distance, to align the further laser beam of the further scanner device with the marking, and to determine the distance by triangulation with the aid of a separation of the scanner device from the further scanner device, e.g., with the aid of a separation of the point of rotation of the scanner device from a point of rotation of the further scanner device, and with the aid of a respective angle at which the laser beam and the further laser beam are aligned with the at least one marking.

In this case, the processing machine includes two or more scanner devices, which can be a part of two or more irradiation devices that are respectively used for irradiating a processing field formed in the processing chamber. The two or more processing fields of the scanner devices generally overlap at least partially, so that at least one, optionally a plurality, of the markings are swept by two or more laser beams, which are aligned by two different scanner devices with the processing field, and a respective (rotation) angle at which the laser beam is aligned with the marking can be determined.

In a further embodiment, the detector is configured as a detector that does not resolve position, e.g., as a diode. In this embodiment, the detector is therefore not a position-resolving detector. The detection of the intensity of the laser radiation by means of a detector that does not resolve position is sufficient in the present case, because the position of the laser beam in the processing field can be varied very precisely with the aid of the scanner device, which typically includes one or two galvanometer mirrors. A detector in the form of a diode may already be provided in the processing machine for process observation during the production of the three-dimensional component, so that it may advantageously also be used for the calibration of the processing machine. It is to be understood that the (photo)diode may have a high sensitivity for the wavelength range of the laser beam used for the calibration. Because of the precise positioning of the laser beam focus on the construction platform/ preform with a position accuracy in the range of micrometers, or possibly in the submicrometer range, the actual position of the retroreflectors may be determined very precisely in this case.

DESCRIPTION OF DRAWINGS

Further advantages of the invention are found in the description and the drawing. Likewise, the features mentioned above and those referred to below can be used independently, or several of them can be used in any desired combinations. The embodiments shown and described are not to be interpreted as an exhaustive list, but rather have an exemplary nature for description of the invention.

DETAILED DESCRIPTION

In the following description of the drawings, identical reference signs are used for components which are the same or functionally equivalent.

Figure 1A:
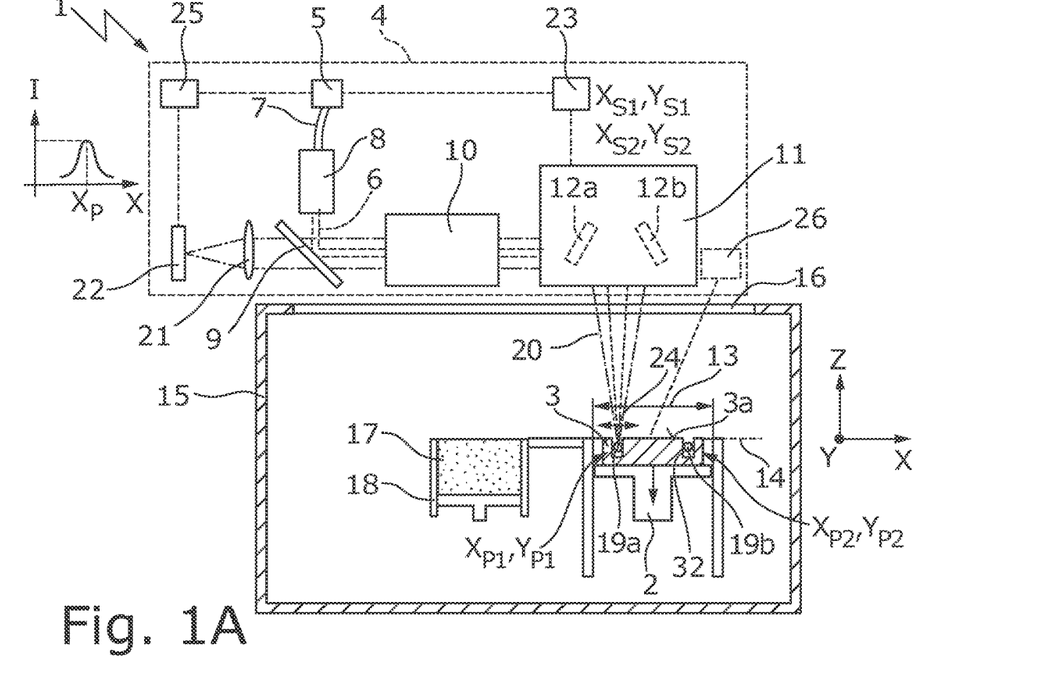
FIGS. 1A and 1B show schematic representations of a processing machine for the production of three-dimensional components, which includes a construction platform with a preform, on which two retroreflectors are applied.

FIG. 1A shows an example of a structure of a processing machine 1 for the production of a three-dimensional component (not graphically represented). The processing machine 1 includes a height-adjustable construction platform 2, on which powder layers can be applied in order to construct the three-dimensional component layerwise. In the example shown, a preform 3, which forms a lower part of the component to be produced, is fixed to the construction platform 2. The generally metallic material of the preform 3 is selected in such a way that it bonds to the generally likewise metallic powder material during the local irradiation and local fusion of the powder layers. The fixing of the preform 3 to the construction platform 2 is carried out by a clamp connection (not represented in detail).

For the irradiation of the powder layers, the processing machine 1 includes an irradiation device 4, which includes a laser source 5 in the form of a fiber laser for generating a laser beam 6, which is guided by a fiber optic cable 7 and a collimation device 8 onto a deflection mirror 9. In the example shown, the laser beam 6 is a pilot laser beam, which is used for the calibration (see below). For the irradiation or the local fusion of the powder layers, a processing laser beam with a higher power is used, which is likewise generated by the laser source 5 in the form of the fiber laser. In the example shown, the pilot laser beam 6 has a wavelength that differs from the wavelength of the processing laser beam. In the example shown in FIG. 1A, the deflection mirror 9 comprises a dielectric coating with a reflectivity of more than about 99.9% for the wavelength of the processing laser beam and a reflectivity of from about 30% to about 80% for the wavelength of the pilot laser beam 6, so that a significant proportion of the intensity of the pilot laser beam 6 is deflected at the deflection mirror 9 toward a focusing device 10.

After the focusing device 10, the laser beam 6 passes through a scanner device 11, which comprises two scanner mirrors 12a, 12b in the form of galvanometer mirrors. The scanner device 11 is used for positioning the laser beam 6 in a processing field 13 of the scanner device 11, which is delimited by a maximum angle deflection of the scanner mirrors 12a, 12b and, in the example shown in FIG. 1A, corresponds substantially to the lateral extent of the powder bed, or of the construction platform 2. The focusing device 10 focuses the laser beam 6 in a processing plane 14, which corresponds to an XY plane of an XYZ coordinate system, in which the uppermost of the powder layers, or the upper side of the powder bed which is fused by the laser beam 6, or the processing laser beam, is located during the production of the three-dimensional component.

As may likewise be seen in FIG. 1A, the construction platform 2 is displaceable, or height-adjustable, in the Z direction by means of a drive (not graphically represented). The construction platform 2 is arranged in a processing chamber 15 having a window 16, through which the laser beam 6 is radiated into the processing chamber 15. Since the processing plane 14, or the focal plane of the scanner device 11, in which the powder material is fused, remains at a constant distance from the scanner device 11 during the production of the three-dimensional component, the construction platform 2 is lowered by the thickness of one powder layer to apply a new powder layer.

New powder material 17 is taken with the aid of a slide arm (not graphically represented) from a powder reservoir 18 likewise arranged in the processing chamber 15 and brought into the region of a powder bed, which is located above the construction platform 2 in a construction cylinder surrounding the construction platform 2 during the production of the three-dimensional component. In the representation shown in FIG. 1A, the processing machine 1 is shown in a state before the production of the three-dimensional component, in which there is still no powder material 17 on the construction platform 2, which makes it possible to calibrate the processing machine 1.

To this end, in the example shown in FIG. 1A, two retroreflectors 19a, 19b in the form of a three-dimensional object, e.g., in the form of transparent spheres made of sapphire ($Al_2O_3$), are applied on the preform 3. The two retroreflectors 19a, 19b are respectively applied next to the outer edge of the substantially plate-shaped preform 3, on diametrically opposite sides of the preform 3. The preform 3, or more precisely the upper side 3a of the preform 3, is arranged approximately at the height of the processing plane 14 for the calibration. It is to be understood that the retroreflectors 19a,b may also be fastened to other locations on the preform 3.

In the example shown, the retroreflectors 19a,b in the form of spheres have a diameter of about 4 mm and reflect laser radiation 20 that constitutes a proportion of, for example, more than 5% of the intensity of the laser beam 6, back into the scanner device 11. The diameter of a respective retroreflector 19a,b in the form of the sphere may also be less than 1 mm, for example about 100 μm or less. For handling reasons, it is however advantageous for the retroreflectors 19a,b to have a diameter of about 1 mm or more.

In the example shown in FIG. 1A, the laser beam 6 strikes the first retroreflector 19a substantially perpendicularly to the processing plane 14 in which the respective powder layers also extend, although it is to be understood that even with an incidence direction of the laser beam 6 differing from normal incidence, a significant radiation portion of the laser beam 6, typically more than about 5%, optionally more than about 90%, is reflected at the first retroreflector 19a back to the scanner device 11.

The laser radiation 20 reflected back passes through the scanner device 11 and the focusing device 10 in the opposite direction to the laser beam 6, and strikes the deflection mirror 9. At the deflection mirror 9, a small proportion of the laser radiation 20 reflected back is transmitted and imaged, or focused, with the aid of an imaging device 21, which in the example shown in FIG. 1A is configured as a lens, onto a detector 22 in the form of a photodiode. The detector 22, or the photodiode, is arranged coaxially with the beam path of the laser beam 6 and essentially detects laser radiation 20 that comes from an actual position $X_{P1}$, $Y_{P1}$ of the laser beam 6 in the processing field 13, at which the first retroreflector 19a is arranged in the example shown in FIG. 1A, and is reflected back by the latter to the scanner device 11, i.e. the actual position $X_{P1}$, $Y_{P1}$ of the laser beam 6 coincides with the actual position $X_{P1}$, $Y_{P1}$ of the first retroreflector 19a.

The actual position $X_{P1}$, $Y_{P1}$ of the first retroreflector 19a may differ from a setpoint position $X_{S1}$, $Y_{S1}$, which is specified to the scanner device 11 by a control device 23, if the preform 3 deviates from a setpoint position and/or from a setpoint alignment in the processing machine 1. In the setpoint alignment, the preform 3, or more precisely its upper side 3a, is aligned parallel with the processing plane 14. In the setpoint position, the preform 3 is in a predetermined lateral position relative to the fixed coordinate system of the processing machine 1 and has a predetermined orientation relative to the fixed coordinate system.

To allow maximally precise connection of the three-dimensional component during the construction of the preform 3, i.e., to join the contour of the component section constructed on the preform 3 as precisely as possible to a contour predetermined by the preform 3, it is necessary to know the location or the positioning of the preform 3 relative to the coordinate system of the scanner device 11, or relative to the fixed coordinate system of the processing machine 1, and to carry out calibration during which deviations from the setpoint position and the setpoint alignment of the preform 3 may be corrected. For the correction, for example, the positions or the component coordinates of the three-dimensional component, which is intended to be constructed on the preform 3, can be adapted to the coordinate system that is predetermined by the preform 3, i.e., the respective setpoint positions that are specified to the laser beam 6 to produce the three-dimensional component can be corrected accordingly. To this end, calibration is necessary, i.e., it is necessary to determine the location of the preform 3 in space as precisely as possible.

To achieve this, the procedure described below can be used. A setpoint position $X_{S1}$, $Y_{S1}$ at which the first retroreflector 19*a* is arranged nominally, i.e., when the preform 3 has the desired arrangement in space, is specified to the scanner device 11. Using the laser beam 6, a predetermined search region 24 around the setpoint position $X_{S1}$, $Y_{S1}$ of the first retroreflector 19*a* is scanned coarsely, i.e., with a relatively low resolution. In the example shown in FIG. 1A, the search region 24 is squarely shaped, and the setpoint position $X_{S1}$, $Y_{S1}$ of the first retroreflector 19*a* is at the center, although a search region 24 with a different geometry, for example, a rectangular or circular search region 24, can also be used.

If the retroreflector 19*a* is detected, for example, because the measured intensity I of the laser radiation 20 reflected back lies above a threshold value, the scanner device 11 scans a smaller region of the processing field 13 around the setpoint position $X_{S1}$, $Y_{S1}$ of the first retroreflector 19*a* with the laser beam 6 with a higher resolution, and the laser radiation 20 reflected back is respectively being detected, i.e., the laser beam 6 sweeps the first retroreflector 19*a* several times in a scanning movement and is then detected. The actual position $X_{P1}$, $Y_{P1}$ of the first retroreflector 19*a* is determined in an evaluation device 25 with the aid of the intensity distribution I(X, Y) of the detected laser radiation 20. As is the case with the "control device" described herein, the "evaluation device" is a programmable device, including a processor for executing a computer program that can be used to determine the actual position XP1, YP1, e.g., by performing the method steps described herein. The programmable device may be a computer with a suitable software, a programmable logic device, having reconfigurable digital circuits, or a combination of both. The determination of the actual position $X_{P1}$, $Y_{P1}$ of the first retroreflector 19*a*, for example, can be carried out in the manner described below.

First, the two-dimensional intensity distribution I(X,Y) (bitmap) of the laser radiation 20 detected during the repeated sweeping of the first retroreflector 19*a* is recorded by the evaluation device 25. FIG. 1A represents, by way of example, the one-dimensional intensity distribution I(X) recorded during the scanning of the first retroreflector 19*a*, this distribution extending through the center of the two-dimensional intensity distribution I(X,Y). With the aid of an image evaluation algorithm, an intensity centroid of the intensity distribution I(X,Y) is determined, which in the example shown in FIG. 1A, in which the laser beam 6 has a rotationally symmetrical intensity distribution I(X,Y), corresponds to the intensity maximum in the X direction and in the Y direction. The centroid of the intensity distribution I(X,Y) of the detected laser radiation 20 forms the actual position $X_{P1}$, $Y_{P1}$ of the first retroreflector 19*a*. The actual position $X_{P2}$, $Y_{P2}$ of the second retroreflector 19*b* may also be determined correspondingly. The evaluation device 25 transmits the actual positions $X_{P1}$, $Y_{P1}$; $X_{P2}$, $Y_{P2}$ of the two retroreflectors 19*a,b* to the control device 23.

In the control device 23, deviations of the actual positions $X_{P1}$, $Y_{P1}$; $X_{P2}$, $Y_{P2}$ of the two retroreflectors 19*a,b* from the setpoint positions $X_{PS}$, $Y_{S1}$; $X_{S2}$, $Y_{S2}$, specified to the control device 23, of the two retroreflectors 19*a,b* are determined. For example, to this end an actual difference vector ($X_{P1}$–$X_{P2}$, $Y_{P1}$–$Y_{P2}$) between the actual positions $X_{P1}$, $Y_{P1}$; $X_{P2}$, $Y_{P2}$ of the two retroreflectors 19*a,b* and a setpoint difference vector ($X_{S1}$–$X_{S2}$, $Y_{S1}$–$Y_{S2}$) between the setpoint positions $X_{S1}$, $Y_{S1}$; $X_{S2}$, $Y_{S2}$ of the two retroreflectors 19*a,b* may be determined. The angle between the actual difference vector and the setpoint difference vector corresponds in this case to the rotation of the preform 3 out of the setpoint alignment in the processing plane 14.

A lateral offset of the preform 3 relative to a setpoint position can also be determined, for example, by determining a first difference vector ($X_{P1}$–$X_{S1}$, $Y_{P1}$–$Y_{S1}$) between an actual position $X_{P1}$, $Y_{P1}$ and a setpoint position $X_{S1}$, $Y_{S1}$ of the first retroreflector 19*a* and a second difference vector ($X_{P2}$–$X_{S2}$, $Y_{P2}$–$Y_{S2}$) between an actual position $X_{P2}$, $Y_{P2}$ and a setpoint position $X_{S2}$, $Y_{S2}$ of the second retroreflector 19*b*. The lateral offset corresponds to the vector sum of the first difference vector ($X_{P1}$–$X_{S1}$, $Y_{P1}$–$Y_{S1}$) and the second difference vector ($X_{P2}$–$X_{S2}$, $Y_{P2}$–$Y_{S2}$) divided by the number of vectors (here: two). In the example described here, the calibration may be carried out by suitably correcting the positions, or the position coordinates, which are specified to the control device 23 for the production of the three-dimensional component, for example, by adapting the coordinate system of the scanner device 11 to the coordinate system, rotated and/or displaced relative to the setpoint location, of the preform 3, i.e., to the actual positions $X_{P1}$, $Y_{P1}$; $X_{P2}$, $Y_{P2}$ of the two retroreflectors 19*a,b*.

Error-free calibration or correction of the positioning of the laser beam 6 in the manner described above is possible only when the preform 3 has been leveled, i.e., when the preform 3 is not tilted in relation to the processing plane 14 or when the tilt of the preform 3 with respect to the processing plane 14 is corrected. For the leveling, the processing machine 1 shown in FIG. 1A includes a distance measuring device in the form of a triangulation laser 26, which aligns a triangulation laser beam with the processing field 13. To this end, the triangulation laser 26 uses a structural evaluation of the structures produced, for example in the form of lines, during the projection of the triangulation laser beam in the processing field, and thereby measures a respective distance between the preform 3 and the triangulation laser 26, or the irradiation device 4. In this way, it is possible to determine a tilt of the preform 3 relative to the processing plane 14, or relative to an XY plane extending parallel thereto. The tilt of the preform 3 can be determined according to the above-described determination of the deviations in the X and Y coordinates of the actual positions $X_{P1}$, $Y_{P1}$; $X_{P2}$, $Y_{P2}$ from the setpoint positions $X_{S1}$, $Y_{S1}$; $X_{S2}$, $Y_{S2}$ of the two retroreflectors 19*a,b*, to adapt the correction of the positioning of the laser beam 6 suitably, although in general the determination of the tilt of the preform 3 out of the processing plane 14 generally takes place before the determination of the deviations of the X and Y coordinates of the two retroreflectors 19*a,b* in the processing plane 14.

The leveling can, for example, be used to modify the setpoint positions $X_{S1}$, $Y_{S1}$; $X_{S2}$, $Y_{S2}$ of the two retroreflectors 19*a,b* suitably in the control device 23, and specifically in such a way as if the retroreflectors 19*a,b* were arranged in the processing plane 14 and not offset relative thereto in the Z direction. As an alternative or in addition, it is possible to correct the tilt of the construction platform 2 relative to the processing plane 14 by the control device 23 acting on suitable adjustment device(s) (not graphically represented), for example in the form of adjustment screws, which are applied on the construction platform 2 or in the vicinity of the construction platform. The control device is implemented as a programmable device, e.g. a computer or the like, e.g., including a processor that can execute a computer program. The computer program can generate control commands for the adjustment device(s) via suitable control signals. In some embodiments, the evaluation device and the control device are implemented in the same hardware and/or software. For the case in which the preform 3 and the construction platform 2 are not tilted relative to one another, not only the construction platform 2, but also the preform 3 can be aligned in parallel with the processing plane 14 in this way.

Figure 2:
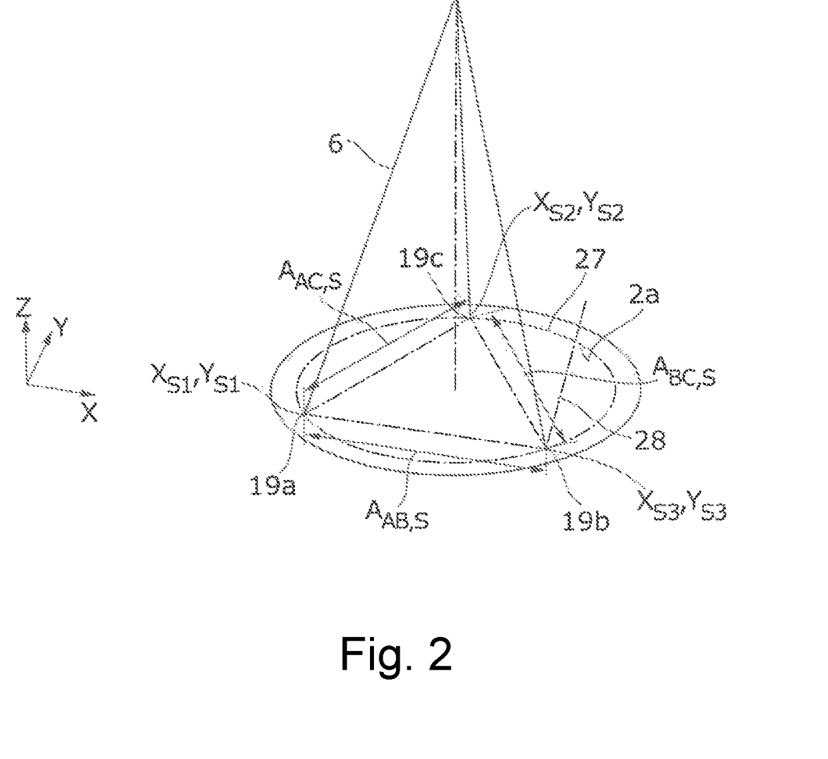
FIG. 2 shows a representation of the upper side of a construction platform, on which three markings in the form of retroreflectors, which form the vertices of a triangle, are applied.

For the case in which the preform 3 has a relatively large height, or possibly an unfavorable geometry, which shadows the triangulation laser beam, the tilt cannot readily be determined by triangulation. In the example shown in FIG. 2, the tilt of the construction platform 2 relative to the processing plane 14 is therefore determined with the aid of three retroreflectors 19a-c. As can be seen in FIG. 2, the three retroreflectors 19a-c are applied in the vicinity of the outer edge of the circular upper side 2a of the construction platform 2, and specifically on an (imaginary) circle 27, and the three retroreflectors 19a-c form the three vertices of an equilateral triangle. In the simplified example shown in FIG. 2, all three retroreflectors 19a-c lie at their setpoint positions $X_{S1}$, $Y_{S1}$, $X_{S2}$, $Y_{S2}$, $X_{S3}$, $Y_{S3}$ in the processing plane 14, i.e., the construction platform 2 shown in FIG. 2 is arranged exactly at its setpoint location and is correctly aligned.

In this case, the setpoint distance $A_{AB,S}$ between the first and the second retroreflector 19a,b corresponds precisely to the actual distance $A_{AB,I}$ between the first and the second retroreflector 19a,b. The same applies for the setpoint distances $A_{BC,S}$, $A_{AC,S}$ and the actual distances $A_{BC,I}$, $A_{AC,I}$ between the second and the third retroreflector 19b, 19c and the first and the third retroreflector 19a, 19c.

Figure 3:
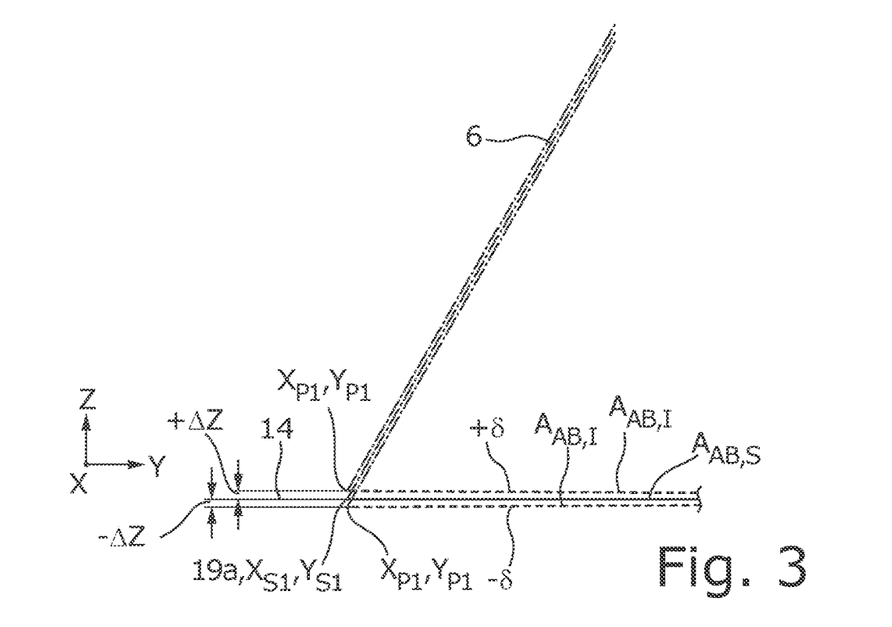
FIG. 3 shows a side view representation of the variation of an actual position of the first retroreflector of FIG. 2 in the event of a tilt of the construction platform out of a processing plane.

FIG. 3 shows a detail of FIG. 2 in the vicinity of the first retroreflector 19a, and specifically along the connecting line between the first retroreflector 19a and the second retroreflector 19b. A solid line in FIG. 3 shows the alignment, represented in FIG. 2, of the construction platform 2, in which the construction platform 2 lies in the processing plane 14 (XY plane). Broken lines in FIG. 3 represent two cases in which the construction platform 2 is tilted in the region of the first retroreflector 19a by a small tilt angle +δ upward and by a small tilt angle −δ downward from the processing plane 14, respectively.

As can be seen in FIG. 3, in the event of a tilt of the construction platform 2 in the region of the first retroreflector 19a upward, i.e., in the positive Z direction (+Δz), the actual position $X_{P1}$, $Y_{P1}$ of the first retroreflector 19a is displaced in the direction of the actual or setpoint position $X_{P2}$, $Y_{P2}$ of the second retroreflector 19b, i.e., the distance $A_{AB,I}$ determined between the actual positions $X_{P1}$, $Y_{P1}$, $X_{P2}$, $Y_{P2}$ of the two retroreflectors 19a,b is increased. This is identified by the scanner device 11 by the deflection angle that the laser beam 6 has at the actual position $X_{P1}$, $Y_{P1}$ of the first retroreflector 19a likewise being increased compared with the case in which the construction platform 2 is arranged in the processing plane 14.

Correspondingly, by a tilt of the construction platform 2 in the region of the first retroreflector 19a downward, i.e., in the negative Z direction (−Δz), the determined actual position $X_{P1}$, $Y_{P1}$ of the first retroreflector 19a is moved toward the actual or setpoint position $X_{P2}$, $Y_{P2}$ of the second retroreflector 19b, so that the deflection angle of the laser beam 6 at the actual position $X_{P1}$, $Y_{P1}$ of the first retroreflector 19a, and therefore the actual distance $A_{AB,I}$ determined between the two retroreflectors 19a,b, is decreased.

If it is assumed that the tilt axis 28 (cf. FIG. 2) in the case of the tilt of the construction platform 2 runs through the second retroreflector 19b and extends in the Y direction, i.e., parallel to the connecting line between the two retroreflectors 19a, 19b, the tilt of the construction platform 2, or the tilt angle +/−δ of the construction platform 2 in the XZ plane, may be determined directly from the difference between the actual distance $A_{AB,I}$ and the setpoint distance $A_{AB,S}$ of the first and the second retroreflector 19a,b.

It is to be understood that, in general, the location of the tilt axis 28 about which the construction platform 2 is tilted out of the processing plane 14 is generally not known. With the aid of the known setpoint distances $A_{AB,S}$, $A_{BC,S}$, $A_{AC,S}$ of the three retroreflectors 19a-c and the determined actual distances $A_{AB,I}$, $A_{BC,I}$, $A_{AC,I}$ of the three retroreflectors 19a-c, the tilt of the construction platform 2, i.e., both the tilt angle δ and the location and the alignment of the tilt axis 28 can, however, also be determined in this case. The correction of the positioning of the laser beam 6 to take the tilt into account can also be carried out in this case in the manner described above in connection with the triangulation laser 26.

The setpoint positions $X_{S1}$, $Y_{S1}$, $X_{S2}$, $Y_{S2}$, $X_{S3}$, $Y_{S3}$ of the three retroreflectors 19a-c, which are specified to the control device 23, depend of course not only on the setpoint position and the setpoint alignment of the construction platform 2, but also on their (fixed) positions relative to the construction platform 2. These positions are typically known, or, if necessary, can be determined before the calibration, for example, by measuring the construction platform 2 with the aid of a coordinate measuring machine before it is introduced into the processing machine 1. It is to be understood that the construction platform 2 need not be configured in one piece as represented above, but may optionally be configured in several pieces. In particular, the construction platform 2 may form a plate-shaped component that is fixed, for example screwed, on a height-adjustable piston.

Figure 4:
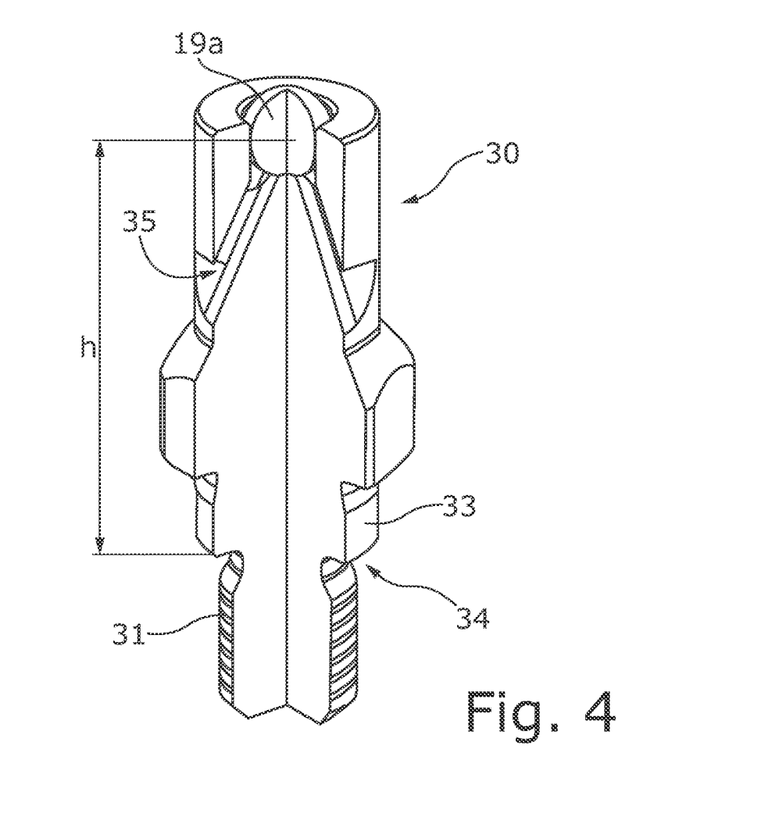
FIG. 4 shows a partial sectional representation of a retroreflector in the form of a transparent sphere, which is held in a frame.

FIG. 4 shows a retroreflector 19a in the form of a transparent sphere made of sapphire, which is held in a frame 30. The frame 30 comprises a screw thread 31 that can be used to fix the frame 30 in a threaded bore 32, represented in FIG. 1A, of the preform 2, or to screw the frame 30 firmly in the threaded bore 32. The frame 30 includes a precision fitting collar 33 to increase the accuracy of the lateral positioning of the sphere 19a or the frame 30 in the threaded bore 32 of the preform 3. The frame 30 also includes an axial end stop 34, on the lower side of the fitting collar 33, relative to which the center of the sphere 19a is positioned at a predetermined height h. The threaded bore 32 is a blind bore with a shoulder, which likewise has a predetermined distance from the upper side 3a of the preform 3. In this way, the upper side of the sphere 19a can be positioned at a distance of a few tenths of a millimeter from the upper side 3a of the preform 3. As may likewise be seen in FIG. 4, the sphere 19a in this case protrudes slightly upward beyond the frame 30 to allow the laser beam 6 to enter from different directions.

As can likewise be seen in FIG. 4, the frame 30 includes openings 35 distributed along its circumference for radiation components of the laser beam 6 to emerge, to minimize absorption of the laser beam 6 in the frame 30 and heating associated therewith as much as possible. In the example shown, the transparent sphere 19a is gripped in the frame 30 by thermally induced tension. To this end, the frame 30 is heated to about 80° C. when inserting the sphere 19a. In order not to lose the tension of the frame 30 during operation of the processing machine 1, in the example shown the frame 30 can be formed from KOVAR® (a nickel-cobalt ferrous alloy), which has an almost identical linear thermal expansion coefficient to sapphire.

It is to be understood that the spheres 19a-c can be applied in a similar way on the construction platform 2. For the application of the retroreflectors 19a-c, for example, in the form of spheres, in a fixed position, it is however also possible to select a different type of—releasable or non-releasable—fastening that allows precise positioning of the retroreflectors 19a-c. Instead of transparent spheres, it is optionally also possible to use spheres made of a material that is not transparent for the laser beam, if the (retro) reflection takes place on the upper/outer side of the sphere. Instead of retroreflectors 19a-c, it is also possible to use different types of markings, which do not necessarily have retroreflective properties. For example, the markings may be surface regions in the form of a coating, which are applied onto a substrate that is applied on the construction platform 2 or on the preform 3. The markings in the form of the surface regions are detected with the aid of at least one different property of an adjacent surface region, which may for example be a section of the substrate.

For the calibration of the processing machine 1, it is necessary to determine a reference height position (zero point) of the construction platform 2 in a height direction Z (hereafter: Z direction) absolutely, i.e., in relation to a predetermined height reference of the processing machine 1. To this end, the markings in the form of the retroreflectors 19a-c can likewise be used, and specifically by determining a distance h of one or more of the retroreflectors 19a-c in relation to the predetermined height reference, which can, for example, be a point of rotation D1 of the scanner device 11, the height position of which in relation to the processing machine 1, or its machine frame, is known. It is to be understood that the determination of the distance h from the point of rotation D1 is equivalent to the determination of the distance from a different height reference, the height position of which in the processing machine 1 is known.

The determination of the distance h between two of the retroreflectors 19a, 19b, which are arranged in a common plane parallel to the processing plane 14, and the point of rotation D1 of the scanner device 11 will subsequently be described with the aid of FIGS. 5A-5C with the aid of a two-dimensional case to simplify the representation. For simplification, it is assumed that the two retroreflectors 19a, 19b and the point of rotation D1 lie in the XZ plane. In this simplified example, the laser beam 6 is rotated by one of the scanner mirrors 12a about an axis of rotation extending in the Y direction and containing the point of rotation D1, to align it with the processing field 13.

For the determination of the distance h in the Z direction, the first scanner mirror 12a is initially rotated about the point of rotation D1 of the scanner device 11 until the laser beam 6 is aligned at an angle α, at which the laser beam 6 strikes the first retroreflector 19a. The alignment of the laser beam 6 with the first retroreflector 19a is recognized as described above by detecting laser radiation 20 reflected back into the scanner device 11.

In a subsequent step, the first scanner mirror 12a is rotated about the point of rotation D1 until the laser beam 6 is aligned at a second (viewing) angle β, at which the laser beam 6 strikes the second retroreflector 19b. As shown by the representation in FIG. 5A, the distance h in the Z direction can be determined by conventional triangulation while taking into account the distance $A_{AB}$ between the two markings 19a, 19b, which extends perpendicularly to the height direction, according to the following formula:

$$h = A_{AB}/(\tan(\alpha)+\tan(\beta)) \quad (1)$$

Figure 5A:
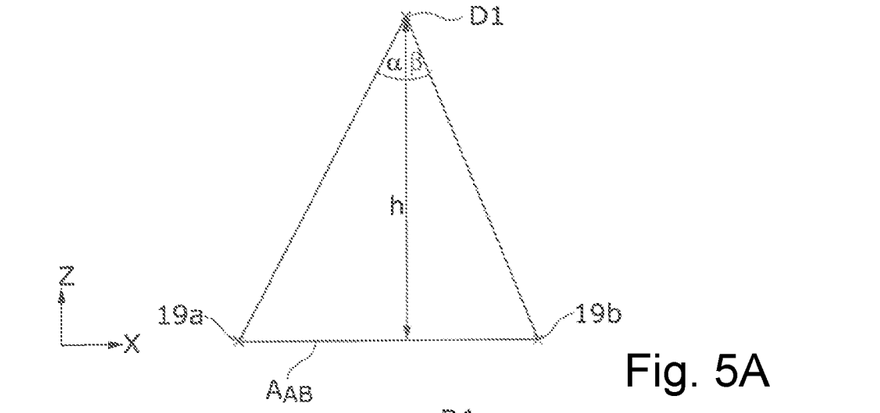
FIGS. 5A-5C show schematic representations of a plurality of triangles for the determination by triangulation of a distance in the height direction between two markings and a point of rotation of a scanner device.

During the determination of the distance h in the Z direction in the manner described in FIG. 5A, however, the problem can arise that the distance $A_{AB}$ between the two retroreflectors 19a, 19b cannot be determined precisely, since as described above the retroreflectors 19a, 19b have been configured in the form of spheres and are introduced into a respective frame 30, these being fixed by means of a screw thread 31 in a threaded bore 32 of the preform 3, or of the construction platform 2. The distance $A_{AB}$ between the two retroreflectors 19a, 19b is therefore affected by a relatively large measurement inaccuracy. To eliminate this measurement inaccuracy, the measurement can be carried out in the manner described below in connection with FIGS. 5B and 5C, in which, for the determination of the distance h in the Z direction, a different length quantity for the triangulation, which is affected by a smaller measurement inaccuracy, is used instead of the distance $A_{AB}$ between the two retroreflectors 19a, 19b. To this end, it is possible to use the fact that the processing machine 1 includes actuators that allow movement of component parts of the processing machine 1 with a very high accuracy.

Figure 5B:
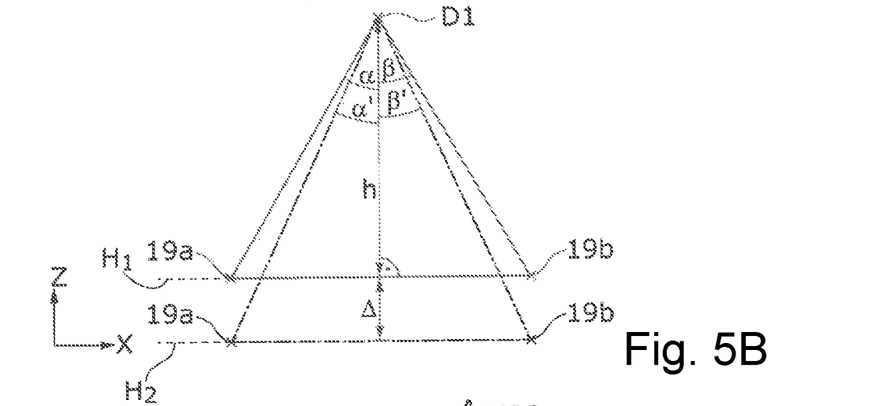

In the example shown in FIG. 5B, a travel distance Δ of the height-adjustable construction platform 2 is used instead of the distance $A_{AB}$ for the triangulation. The travel Δ is covered when the construction platform 2 is displaced by means of an actuator (not denoted in detail) between a first height position $H_1$ and a second height position $H_2$ for the determination of the distance h. The distance h in the Z direction can be determined with the aid of an angle α, at which the laser beam 6 is aligned with the first retroreflector 19a in the first height position $H_1$, and with the aid of an angle α', at which the laser beam 6 is aligned with the first retroreflector 19a in the second height position $H_2$, as well as with the aid of the travel distance Δ, according to the following formula:

$$h = \tan(\alpha')/(\tan(\alpha')-\tan(\alpha))\Delta \quad (2a)$$

Correspondingly, the distance h in the Z direction between the point of rotation D1 and the second retroreflector 19b can be determined with the aid of the travel distance Δ and the two angles β, β', at which the laser beam 6 must be aligned in the two height positions $H_1$, $H_2$ to strike the second retroreflector 19b, according to the following formula:

$$h = \tan(\beta')/(\tan(\beta')-\tan(\beta))\Delta \quad (2b)$$

The distance h from the point of rotation D1 is determined, or measured, in both cases from the first height position $H_1$. It is, however, to be understood that the distance h can be determined similarly starting from the second height position $H_2$. The travel distance Δ of the construction platform 2 can typically be determined with a higher precision than the distance $A_{AB}$ between the two retroreflectors 19a, 19b, so that the distance h in the Z direction can be determined with a higher accuracy in the manner described in connection with FIG. 5B than in FIG. 5A.

Figure 1B:
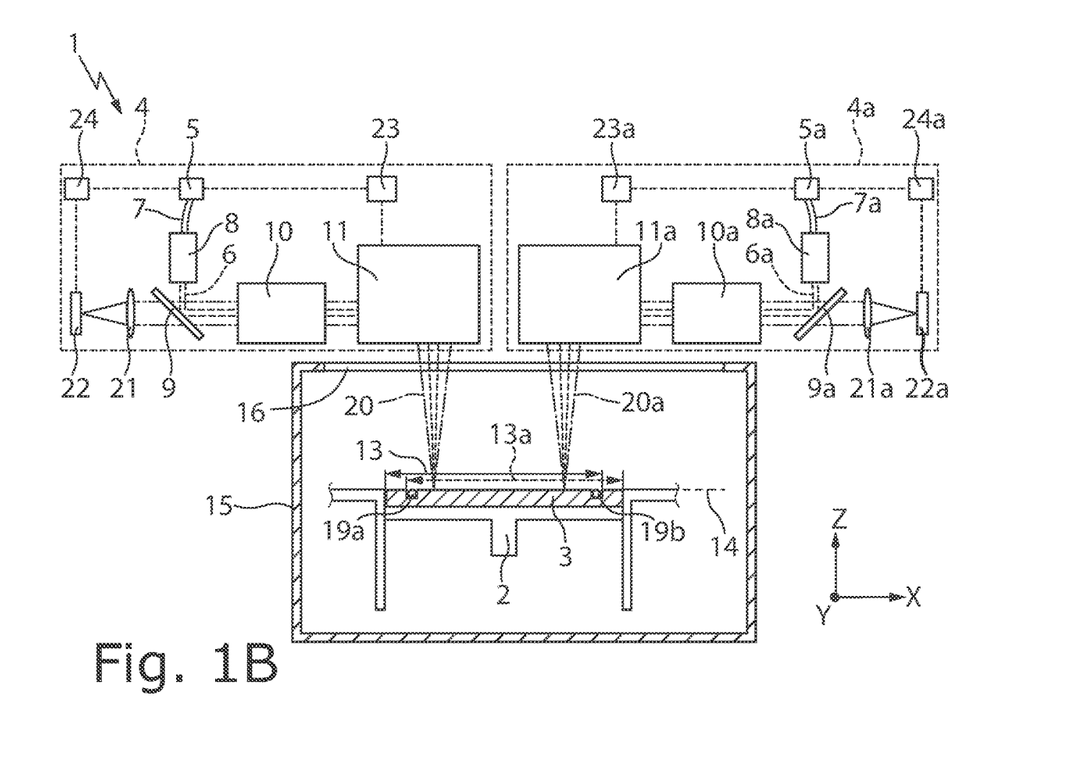

A further possibility for accurate determination of the distance h between the retroreflectors 19a, 19b and the scanner device 11 can be carried out in the processing machine 1 represented in FIG. 1B. The processing machine 1 represented in FIG. 1B differs from the processing machine 1 represented in FIG. 1A essentially in that it includes a further irradiation device 4a, which is constructed identically to the irradiation device 4 shown in FIG. 1, i.e., it includes a further scanner device 11a for positioning a further laser beam 6a in a further processing field 13a, which overlaps partially with the processing field 13 of the scanner device 11. The other component parts of the further irradiation device 4a likewise have the same design as the component parts of the irradiation device 4, and have correspondingly been denoted by references 6a to 11a, 21a to 24a. Both the radiation devices 4, 4a are used for the production of the same three-dimensional component, which in a similar way to FIG. 1A is produced by local fusion of powder layers (not shown in FIG. 1B) that are applied onto the construction platform 2, or onto the preform 3.

With the aid of the further scanner device 11a, the distance h in the Z direction can be determined by a respective angle γ, δ at which the further laser beam 6a of the further scanner device 11a, which comes from a further point of rotation D2 of the further scanner device 11a, is aligned with the first and second retroreflector 19a, 19b, respectively, also being used for the triangulation in addition to the respective angle α, β at which the laser beam 6, which comes from the first point of rotation D1, is aligned with the first and second retroreflector 19a, 19b, respectively.

Figure 5C:
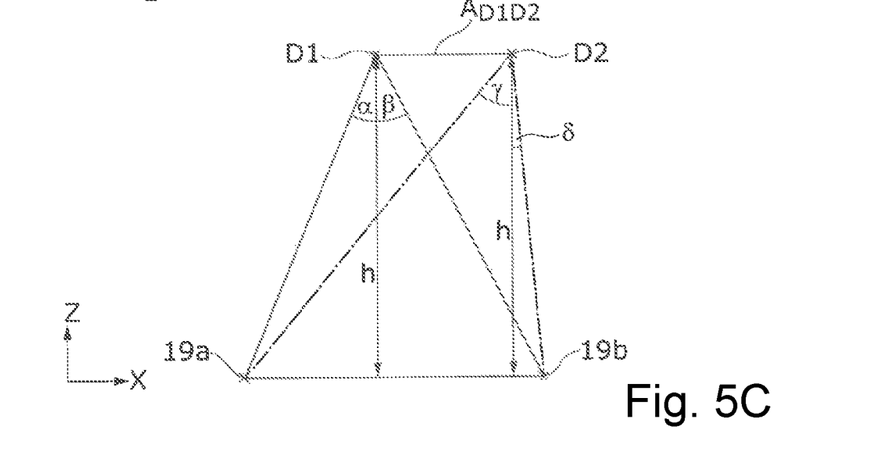

In the example represented in FIG. 5C, the distance h is obtained from the angle α, at which the laser beam 6 is aligned with respect to the Z direction when it strikes the first retroreflector 19a, and from the angle γ, at which the further laser beam 6a is aligned with respect to the Z direction when it strikes the first retroreflector 19a, as well as from the separation $A_{D1D2}$ between the two points of rotation D1, D2, according to the following formula:

$$h = A_{D1D2}/(\tan(\gamma) - \tan(\alpha)) \quad (3a)$$

Correspondingly, the distance h is obtained from the angle β, at which the laser beam 6 is aligned with respect to the Z direction when it strikes the second retroreflector 19b, and from the angle δ, at which the further laser beam 6a is aligned with respect to the Z direction when it strikes the second retroreflector 19b, as well as from the separation $A_{D1D2}$ between the two points of rotation D1, D2, according to the following formula:

$$h = A_{D1D2}/(\tan(\beta) - \tan(\delta)) \quad (3b)$$

The separation $A_{D1D2}$ in the horizontal direction between the two points of rotation D1, D2 of the scanner device 11 and of the further scanner device 11a is determined with a high accuracy beforehand by calibration of the two scanner devices 11, 11a relative to one another, i.e., the measurement inaccuracy during the determination of the separation $A_{D1D2}$ is less than during the determination of the distance $A_{AB}$ between the two retroreflectors 19a, 19b.

To increase the accuracy during the determination of the distance h between the retroreflectors 19a, 19b and the scanner device 11, or the point of rotation D1, the two methods described in connection with FIG. 5B and FIG. 5C can be combined: for example, the distance h can be determined as an (optionally weighted) average value from the two distances h determined according to the above formulae (2a) and (3a), and respectively (2b) and (3b). Both in the procedure described in connection with FIG. 5B and in the procedure described in connection with FIG. 5C, the accuracy during the determination of the distance h can be further increased by carrying out more than two angle measurements.

For example, in the procedure described in connection with FIG. 5B, the construction platform 2 can be displaced in the Z direction to three or more different height positions $H_1, H_2, \ldots$, in which case the distance h in the Z direction can be measured several times with the aid of a respective travel distance Δ respectively between two of the height positions and the corresponding angles, and an (optionally weighted) average value can be formed. Correspondingly, in the procedure described in connection with FIG. 5C, the accuracy during the determination of the distance h can be increased further with the aid of further (third, fourth, ...) scanner devices of the processing machine 1. In this case, the same retroreflector 19a-c, for example, can be observed from more than two (viewing) angles, and the distance h can be determined respectively for two of the (viewing) angles. In this case as well, the measurement or detection accuracy can be increased further by (optionally weighted) averaging of the values respectively determined for the distance h.

It is to be understood that although the procedure described above in connection with FIGS. 5A-5C has been described with the aid of retroreflectors 19a-c, it can, in principle, also be carried out with different types of markings. The generalization of the two-dimensional case described in FIGS. 5A-5C to the three-dimensional case is also clear and does not affect the basic procedure.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for calibrating a processing machine for the production of three-dimensional components by irradiation of powder layers, wherein the processing machine comprises a scanner device for positioning a laser beam in a processing field in which a height-adjustable construction platform for the application of the powder layers is positioned, the method comprising:
sweeping the laser beam over at least two markings that are applied on either one or both of the construction platform and a preform fixed to the construction platform;
detecting laser radiation reflected back from the markings into the scanner device during the sweeping of the at least two markings;
determining actual positions of the markings using the detected laser radiation;
determining deviations of the actual positions of the markings from setpoint positions of the markings; and
using the determined deviations to calibrate the processing machine by:
(i) correcting a position comprising one or more of a tilt, a rotation, and a lateral offset of either one or both of the construction platform and the preform in the processing machine
or
(ii) correcting both a positioning of the laser beam in the processing field and the position of either one or both of the construction platform and the preform in the processing machine.

2. The method of claim 1, wherein either one or both of a lateral offset and a rotation of either one or both of the construction platform and the preform, in a processing plane of the processing machine, are corrected using the determined deviations.

3. The method of claim 1, wherein a tilt of either one or both of the construction platform and the preform relative to a processing plane of the processing machine is determined using a distance measurement, and then correcting the determined tilt of either one or both of the construction platform and the preform relative to the processing plane.

4. The method of claim 1, wherein deviations between a respective setpoint distance and a respective actual distance are determined, and then correcting a tilt of either or both of the construction platform and the preform relative to a processing plane of the processing machine using the determined deviations.

5. The method of claim 1, further comprising an additional step of measuring either one or both of the construction platform and the preform using a coordinate measuring machine to determine the setpoint positions of the markings.

6. The method of claim 1, wherein the markings comprise retroreflectors.

7. The method of claim 6, wherein the retroreflectors are spheres, wherein the laser beam is reflected from the retroreflector spheres back into the scanner device, and wherein the actual position of the retroreflector is determined using an intensity distribution of the detected back-reflected laser radiation.

8. The method of claim 7, wherein the sphere is held in a frame that is fixed to the construction platform or to the preform before the calibration.

9. The method of claim 1, wherein the markings are arranged in or in the vicinity of a processing plane of the processing machine by moving the height-adjustable construction platform to carry out the calibration.

10. The method of claim 1, further comprising determining a distance in a height direction between at least one of the markings and the scanner device, by triangulation to align the laser beam at an angle with the at least one of the markings.

11. The method of claim 10, wherein, the distance is determined by displacing the height-adjustable construction platform in the height direction and the distance is determined by triangulation using a travel distance of the construction platform in the height direction between a first height position and a second height position.

12. The method of claim 11, further using an angle at which the laser beam is aligned with the at least one marking at a respective height position to determine the distance.

13. The method of claim 11, wherein the distance is determined by aligning a further laser beam of a further scanner device with the at least one marking and the distance is determined by triangulation using a separation of the scanner device from the further scanner device from a point of rotation of the further scanner device, and using a respective angle at which the laser beam and the further laser beam are aligned with the at least one marking.

14. The method of claim 1, wherein a pilot laser beam is used as the laser beam for the calibration of the processing machine.

15. The method of claim 1, further comprising detecting at least one retroreflector in the processing field by scanning at least one search region, predetermined with the aid of the setpoint position of the retroreflector, in the processing field by the laser beam.

16. The method of claim 1, wherein there are at least three markings.

17. The method of claim 16, wherein there are three markings arranged in a triangle.

* * * * *